United States Patent
Copeland

(10) Patent No.: US 11,481,785 B2
(45) Date of Patent: *Oct. 25, 2022

(54) AGNOSTIC CUSTOMER RELATIONSHIP MANAGEMENT WITH BROWSER OVERLAY AND CAMPAIGN MANAGEMENT PORTAL

(71) Applicant: Accenture Global Solutions Limited, Dublin (IE)

(72) Inventor: Shannon Copeland, Atlanta, GA (US)

(73) Assignee: Accenture Global Solutions Limited, Dublin (IE)

( * ) Notice: Subject to any disclaimer, the term of this patent is extended or adjusted under 35 U.S.C. 154(b) by 79 days.

This patent is subject to a terminal disclaimer.

(21) Appl. No.: 16/857,341

(22) Filed: Apr. 24, 2020

(65) Prior Publication Data

US 2021/0334816 A1    Oct. 28, 2021

(51) Int. Cl.
*G06Q 30/00* (2012.01)
*G06F 9/445* (2018.01)
(Continued)

(52) U.S. Cl.
CPC ....... *G06Q 30/016* (2013.01); *G06F 9/44526* (2013.01); *G06F 9/451* (2018.02);
(Continued)

(58) Field of Classification Search
CPC ...... G06Q 30/016; G06Q 10/10; G06F 9/451; G06F 16/958; G06F 9/44526; G06T 11/60; G06T 2200/24
(Continued)

(56) References Cited

U.S. PATENT DOCUMENTS 6,785,380 B2    8/2004  Ribera
6,829,603 B1   12/2004  Chai et al.
(Continued)

FOREIGN PATENT DOCUMENTS

KR        101636884       7/2016
KR      1020180058877     7/2018
WO       20160139666 A1   9/2016

OTHER PUBLICATIONS

Yawer Iqbal, Browser extensions for Dynamics CRM, Published Feb. 1, 2018, Iqbal, pp. 1-13 (pdf).*
(Continued)

*Primary Examiner* — Manglesh M Patel
(74) *Attorney, Agent, or Firm* — Fish & Richardson P.C.

(57) ABSTRACT

Automated computing machinery agnostically augmenting a CRM application, including an agent hub that associates an identity of a tele-agent and an indication whether the tele-agent is logged on to the agent hub; the agent hub operatively coupled to a browser, the browser bearing a browser extension through which a sales template for a sales campaign to which the tele-agent is assigned to work is operatively exposed as a GUI overlay of the browser, the overlay overlaid upon a web page of the CRM application; a leadership hub that associates the tele-agent and the sales campaign to which the tele-agent is assigned, the leadership hub operatively coupled to the agent hub; and a campaign management portal that associates the sales campaign and the display template, the display template associating a question and an answer form, the campaign management portal operatively coupled for data communications to the agent hub.

20 Claims, 9 Drawing Sheets

(51) Int. Cl.
  *G06F 16/958* (2019.01)
  *G06Q 10/10* (2012.01)
  *G06T 11/60* (2006.01)
  *G06F 9/451* (2018.01)

(52) U.S. Cl.
  CPC .......... *G06F 16/958* (2019.01); *G06Q 10/10* (2013.01); *G06T 11/60* (2013.01); *G06T 2200/24* (2013.01)

(58) Field of Classification Search
  USPC ........................................ 715/234; 705/304
  See application file for complete search history.

(56) References Cited

U.S. PATENT DOCUMENTS

| | | | |
|---|---|---|---|
| 7,275,083 | B1 | 9/2007 | Seibel et al. |
| 7,486,785 | B2 | 2/2009 | Flores |
| 7,774,378 | B2 | 8/2010 | Nelson |
| 7,962,361 | B2 | 6/2011 | Ramchandani et al. |
| 7,966,369 | B1 | 6/2011 | Briere et al. |
| 8,108,237 | B2 | 1/2012 | Bourne et al. |
| 8,200,527 | B1 | 6/2012 | Thompson et al. |
| 8,296,173 | B2 * | 10/2012 | Raffel ................. G06Q 10/0639 705/7.29 |
| 8,326,676 | B2 | 12/2012 | Rose et al. |
| 8,332,279 | B2 | 12/2012 | Woolston |
| 8,411,843 | B1 | 4/2013 | Cyriac |
| 8,600,804 | B2 | 12/2013 | Ramchandani et al. |
| 8,615,786 | B1 | 12/2013 | Bryce et al. |
| 8,649,500 | B1 | 2/2014 | Cohen et al. |
| 9,049,295 | B1 | 6/2015 | Cooper |
| 9,092,802 | B1 | 7/2015 | Akella |
| 9,165,556 | B1 | 10/2015 | Sugar |
| 9,258,423 | B1 | 2/2016 | Beall et al. |
| 9,390,399 | B2 * | 7/2016 | Parker, III ............. G06Q 30/01 |
| 9,848,082 | B1 | 12/2017 | Lilland |
| 9,860,391 | B1 | 1/2018 | Wu et al. |
| 9,948,783 | B1 | 4/2018 | Farrell |
| 9,998,596 | B1 | 6/2018 | Dunmire et al. |
| 10,026,092 | B2 | 7/2018 | Heater et al. |
| 10,027,803 | B2 | 7/2018 | Krinsky et al. |
| 10,057,423 | B1 | 8/2018 | Sheikh |
| 10,101,976 | B2 | 10/2018 | Cavalcante |
| 10,303,466 | B1 | 5/2019 | Karman |
| 10,438,595 | B2 | 10/2019 | Kim et al. |
| 10,453,032 | B1 | 10/2019 | Obeng et al. |
| 10,482,384 | B1 | 11/2019 | Stoilos |
| 10,831,811 | B2 | 11/2020 | Kraus et al. |
| 10,839,424 | B1 | 11/2020 | Frankel |
| 2002/0059283 | A1 | 5/2002 | Shapiro et al. |
| 2003/0126136 | A1 | 7/2003 | Omoigui |
| 2004/0143473 | A1 | 7/2004 | Tivey et al. |
| 2004/0210881 | A1 | 10/2004 | Friedman |
| 2005/0002502 | A1 | 1/2005 | Cloran |
| 2005/0005266 | A1 | 1/2005 | Datig |
| 2005/0044357 | A1 | 2/2005 | Fano |
| 2005/0091123 | A1 * | 4/2005 | Freishtat ............. G06Q 30/0617 705/26.43 |
| 2005/0105712 | A1 | 5/2005 | Williams et al. |
| 2005/0125276 | A1 | 6/2005 | Rusu |
| 2005/0177380 | A1 * | 8/2005 | Pritchard ........... G06Q 30/0601 705/7.17 |
| 2005/0278297 | A1 | 12/2005 | Nelson |
| 2006/0095273 | A1 | 5/2006 | Montvay et al. |
| 2006/0098625 | A1 | 5/2006 | King |
| 2006/0239439 | A1 | 10/2006 | Blackwood |
| 2006/0242626 | A1 * | 10/2006 | Pham ........................ G06F 8/61 717/121 |
| 2006/0256953 | A1 | 11/2006 | Pulaski et al. |
| 2007/0019618 | A1 | 1/2007 | Shaffer |
| 2007/0064913 | A1 | 3/2007 | Shaffer |
| 2007/0094183 | A1 | 4/2007 | Paek et al. |
| 2007/0208858 | A1 | 9/2007 | Ra et al. |
| 2007/0233561 | A1 | 10/2007 | Golec |
| 2008/0120129 | A1 | 5/2008 | Seubert et al. |
| 2008/0162498 | A1 | 7/2008 | Omoigui |
| 2008/0271059 | A1 | 10/2008 | Ott et al. |
| 2008/0275744 | A1 | 11/2008 | Macintyre et al. |
| 2009/0070322 | A1 | 3/2009 | Salvetti |
| 2009/0089131 | A1 | 4/2009 | Moukas et al. |
| 2009/0132474 | A1 | 5/2009 | Ma |
| 2009/0245500 | A1 | 10/2009 | Wampler |
| 2009/0271192 | A1 | 10/2009 | Marquette |
| 2009/0300528 | A1 | 12/2009 | Stambaugh |
| 2010/0010802 | A1 | 1/2010 | Ruano |
| 2010/0036788 | A1 | 2/2010 | Wu |
| 2010/0063799 | A1 | 3/2010 | Jamieson |
| 2010/0070448 | A1 | 3/2010 | Omoigui |
| 2010/0104087 | A1 | 4/2010 | Byrd et al. |
| 2010/0114563 | A1 | 5/2010 | Choi |
| 2010/0169888 | A1 | 7/2010 | Hare et al. |
| 2011/0077999 | A1 | 3/2011 | Becker et al. |
| 2011/0082829 | A1 | 4/2011 | Kolovski |
| 2011/0113094 | A1 | 5/2011 | Chunilal |
| 2011/0145278 | A1 | 6/2011 | Maes |
| 2011/0179102 | A1 * | 7/2011 | Ravichandran ..... H04L 41/5048 709/202 |
| 2011/0206198 | A1 | 8/2011 | Freedman |
| 2011/0214050 | A1 | 9/2011 | Stambaugh |
| 2011/0264451 | A1 | 10/2011 | Hoepfinger |
| 2011/0289106 | A1 * | 11/2011 | Rankin, Jr. ............. G06F 16/93 707/769 |
| 2011/0314366 | A1 * | 12/2011 | Parker, III ............. G06Q 30/02 715/221 |
| 2012/0059776 | A1 | 3/2012 | Estes |
| 2012/0078636 | A1 | 3/2012 | Ferrucci |
| 2012/0143881 | A1 | 6/2012 | Baker et al. |
| 2012/0233558 | A1 | 9/2012 | Naim |
| 2012/0275642 | A1 | 11/2012 | Aller |
| 2012/0303355 | A1 | 11/2012 | Liu et al. |
| 2013/0006916 | A1 | 1/2013 | McBride |
| 2013/0091090 | A1 | 4/2013 | Spivack et al. |
| 2013/0144685 | A1 | 6/2013 | Reynolds |
| 2013/0151314 | A1 | 6/2013 | Kugler et al. |
| 2013/0163731 | A1 | 6/2013 | Yan |
| 2013/0173798 | A1 | 7/2013 | Micucci et al. |
| 2013/0174019 | A1 | 7/2013 | Braud et al. |
| 2013/0204663 | A1 | 8/2013 | Kahlow |
| 2013/0227431 | A1 | 8/2013 | Vasudevan et al. |
| 2013/0262074 | A1 | 10/2013 | Heidasch |
| 2013/0268357 | A1 | 10/2013 | Heath |
| 2013/0282594 | A1 | 10/2013 | Gaedcke et al. |
| 2013/0326048 | A1 | 12/2013 | Heidasch |
| 2014/0022328 | A1 | 1/2014 | Gechter et al. |
| 2014/0081585 | A1 | 3/2014 | Cappucino et al. |
| 2014/0081714 | A1 | 3/2014 | Debow et al. |
| 2014/0081934 | A1 | 3/2014 | Mizell |
| 2014/0122535 | A1 | 5/2014 | Gerard |
| 2014/0122993 | A1 | 5/2014 | Calvin et al. |
| 2014/0164502 | A1 | 6/2014 | Khodorenko |
| 2014/0189680 | A1 | 7/2014 | Kripalani |
| 2014/0201234 | A1 | 7/2014 | Lee et al. |
| 2014/0214530 | A1 | 7/2014 | Duva et al. |
| 2014/0270108 | A1 | 9/2014 | Riahi et al. |
| 2014/0278343 | A1 | 9/2014 | Tran |
| 2014/0279059 | A1 | 9/2014 | Margrett et al. |
| 2014/0314225 | A1 | 10/2014 | Riahi |
| 2014/0372630 | A1 | 12/2014 | Bostick |
| 2014/0379755 | A1 | 12/2014 | Kuriakose |
| 2015/0012350 | A1 | 1/2015 | Li et al. |
| 2015/0066479 | A1 | 3/2015 | Pasupalak |
| 2015/0066580 | A1 * | 3/2015 | Bryant ............... G06Q 30/0201 705/7.29 |
| 2015/0142704 | A1 | 5/2015 | London |
| 2015/0189085 | A1 | 7/2015 | Riahi et al. |
| 2015/0201077 | A1 | 7/2015 | Konig et al. |
| 2015/0213512 | A1 | 7/2015 | Spievak et al. |
| 2015/0242410 | A1 | 8/2015 | Pattabhiraman et al. |
| 2015/0254234 | A1 | 9/2015 | Dixit et al. |
| 2015/0261743 | A1 | 9/2015 | Sengupta |
| 2015/0294405 | A1 | 10/2015 | Hanson |
| 2015/0309994 | A1 | 10/2015 | Liu |
| 2015/0347951 | A1 | 12/2015 | Tamblyn et al. |

(56) References Cited

U.S. PATENT DOCUMENTS

| | | |
|---|---|---|
| 2015/0348551 A1 | 12/2015 | Gruber |
| 2015/0379603 A1 | 12/2015 | Gupta |
| 2016/0006875 A1 | 1/2016 | Burmeister et al. |
| 2016/0019882 A1 | 1/2016 | Matula |
| 2016/0021181 A1 | 1/2016 | Ianakiev et al. |
| 2016/0034457 A1 | 2/2016 | Bradley |
| 2016/0036981 A1 | 2/2016 | Hollenberg |
| 2016/0036982 A1 | 2/2016 | Ristock |
| 2016/0036983 A1 | 2/2016 | Korolev |
| 2016/0078455 A1 | 3/2016 | O'Donnell et al. |
| 2016/0103803 A1 | 4/2016 | Lam |
| 2016/0117593 A1 | 4/2016 | London |
| 2016/0142541 A1 | 5/2016 | Sharpe et al. |
| 2016/0162913 A1 | 6/2016 | Linden et al. |
| 2016/0171099 A1 | 6/2016 | Lorge et al. |
| 2016/0173693 A1 | 6/2016 | Spievak et al. |
| 2016/0188686 A1 | 6/2016 | Hopkins |
| 2016/0189028 A1 | 6/2016 | Hu et al. |
| 2016/0217479 A1 | 7/2016 | Kashyap et al. |
| 2016/0239851 A1 | 8/2016 | Tanner |
| 2016/0162474 A1 | 9/2016 | Agarwal |
| 2016/0308999 A1* | 10/2016 | Bonmassar ........... H04L 67/327 |
| 2016/0321748 A1 | 11/2016 | Mahatm |
| 2016/0335544 A1 | 11/2016 | Bretschneider et al. |
| 2016/0371724 A1 | 12/2016 | Kulpa et al. |
| 2016/0378328 A1 | 12/2016 | Abrahams et al. |
| 2017/0006135 A1 | 1/2017 | Siebel et al. |
| 2017/0017517 A1 | 1/2017 | Kandappan et al. |
| 2017/0017694 A1 | 1/2017 | Roytman et al. |
| 2017/0024375 A1 | 1/2017 | Hakkani-Tur |
| 2017/0076295 A1 | 3/2017 | Vasudev et al. |
| 2017/0091390 A1 | 3/2017 | Joul |
| 2017/0124193 A1 | 5/2017 | Li |
| 2017/0147635 A1 | 5/2017 | McAteer et al. |
| 2017/0154108 A1 | 6/2017 | Li et al. |
| 2017/0177715 A1 | 6/2017 | Chang |
| 2017/0200220 A1 | 7/2017 | Nicholson |
| 2017/0195488 A1 | 8/2017 | Pendyaia |
| 2017/0262429 A1 | 9/2017 | Harper |
| 2017/0262530 A1 | 9/2017 | Okura |
| 2017/0264575 A1 | 9/2017 | Willshire |
| 2017/0293610 A1 | 10/2017 | Tran |
| 2017/0315683 A1 | 11/2017 | Boucher et al. |
| 2017/0329466 A1 | 11/2017 | Krenkler et al. |
| 2018/0052861 A1 | 2/2018 | Seetharaman et al. |
| 2018/0082183 A1 | 3/2018 | Hertz et al. |
| 2018/0115644 A1 | 4/2018 | Al-Khaja |
| 2018/0144250 A1 | 5/2018 | Kwon |
| 2018/0150459 A1 | 5/2018 | Farid |
| 2018/0157685 A1 | 6/2018 | Flerl et al. |
| 2018/0189349 A1 | 7/2018 | Sirohi et al. |
| 2018/0219849 A1* | 8/2018 | Jones ..................... H04L 67/20 |
| 2018/0288098 A1 | 10/2018 | Wang |
| 2018/0300310 A1 | 10/2018 | Shinn |
| 2018/0315000 A1 | 11/2018 | Kulkarni |
| 2018/0315001 A1 | 11/2018 | Garner |
| 2018/0338040 A1 | 11/2018 | Carly |
| 2018/0365772 A1 | 12/2018 | Thompson |
| 2018/0376002 A1 | 12/2018 | Abraham |
| 2019/0042988 A1 | 2/2019 | Brown |
| 2019/0080370 A1 | 3/2019 | Copeland |
| 2019/0121856 A1 | 4/2019 | Terry et al. |
| 2019/0158309 A1 | 5/2019 | Park et al. |
| 2019/0188617 A1 | 6/2019 | Copeland |
| 2019/0206400 A1 | 7/2019 | Cui |
| 2019/0220794 A1 | 7/2019 | Kulkarni |
| 2019/0312869 A1 | 10/2019 | Han et al. |
| 2019/0340294 A1 | 11/2019 | Spangler |
| 2019/0340622 A1 | 11/2019 | Azoulay et al. |
| 2019/0347668 A1 | 11/2019 | Williams et al. |
| 2019/0391825 A1 | 12/2019 | Jann et al. |
| 2019/0394332 A1 | 12/2019 | Dunmire et al. |
| 2020/0007530 A1 | 1/2020 | Mohamad Abdul et al. |
| 2020/0042642 A1 | 2/2020 | Bakis |
| 2020/0057946 A1 | 2/2020 | Singaraju et al. |
| 2020/0097814 A1 | 3/2020 | Devesa |
| 2020/0110835 A1 | 4/2020 | Zhao |
| 2020/0111485 A1 | 4/2020 | Copeland |
| 2020/0175545 A1 | 6/2020 | Handrigan et al. |
| 2020/0184278 A1 | 6/2020 | Zadeh et al. |
| 2020/0226156 A1 | 7/2020 | Borra et al. |
| 2020/0374395 A1 | 11/2020 | Tsao et al. |
| 2021/0232996 A1 | 7/2021 | Copeland |
| 2021/0334756 A1 | 10/2021 | Copeland |
| 2021/0334815 A1 | 10/2021 | Copeland |

OTHER PUBLICATIONS

Manochar Chapalamadugu, New Agile CRM Chrome Extension, Published Jul. 21, 2014, agilecrm.com, pp. 1-3 (pdf).*

Jan. 10, 2020 Office Action for corresponding U.S. Appl. No. 15/700,210.

Jan. 25, 2020 Office Action for corresponding U.S. Appl. No. 15/844,512.

Jul. 25, 2019 Office Action for corresponding U.S. Appl. No. 16/198,742.

Final Office Action dated Jul. 27, 2020 for corresponding U.S. Appl. No. 15/844,512.

Final Office Action dated Jul. 30, 2020 for corresponding U.S. Appl. No. 16/154,718.

Final Office Action dated Jul. 7, 2020 for corresponding U.S. Appl. No. 15/700,210.

Mar. 5, 2020 Office Action for corresponding U.S. Appl. No. 16/183,736.

May 4, 2020 Office Action for corresponding U.S. Appl. No. 16/154,718.

Non-Final Office Action dated Sep. 29, 2020 for corresponding U.S. Appl. No. 16/157,075.

Non-Final Office Action dated Sep. 30, 2020 for corresponding U.S. Appl. No. 16/911,717.

Oct. 19, 2020 Notice of Allowance for corresponding U.S. Appl. No. 16/157,075.

Liew. "Strategic integration of knowledge management and customer relationship 1-20 management." In: Journal of Knowledge Management. Jul. 18, 2008 (Jul. 18, 2008) Retrieved on Dec. 25, 2019 (Dec. 25, 2019) from <http://student.bms.lk/GDM/49/Slides/MarManaSampleAssi/MMAsuportingJouArti/13673270810884309.pdf> entire document.

Tung. "Google's human-sounding AI to answer calls at contact centers." In: ZDNet. Jul. 25, 2018 (Jul. 25, 2018) Retrieved on Dec. 25, 2019 (Dec. 25, 2019) from <https://www.zdnet.com/article/googles-human-sounding-ai-to-answer-calls-at-contact-centers/> entire document.

International Search Report and Written Opinion dated Jan. 9, 2020 for PCT/US2019/055488.

International Search Report and Written Opinion dated Jan. 14, 2020 for PCT/US2019/060174.

International Search Report and Written Opinion dated Jan. 17, 2020 for PCT/US2019/058997.

International Search Report and Written Opinion dated Feb. 22, 2019 for PCT/US2018/065584.

International Search Report and Written Opinion dated Mar. 9, 2020 for PCT/US2019/059949.

International Search Report and Written Opinion dated Apr. 1, 2020 for PCT/US2019/055483.

International Search Report and Written Opinion dated Nov. 28, 2018 for PCT/US2018/049813.

International Search Report and Written Opinion dated Dec. 30, 2019 for PCT/US2019/062629.

PCT International Search Report and Written Opinion in International Appln. No. PCT/US2021/070096, dated Jun. 10, 2021, 6 pages.

* cited by examiner

AGNOSTIC CUSTOMER RELATIONSHIP MANAGEMENT WITH BROWSER OVERLAY AND CAMPAIGN MANAGEMENT PORTAL

The following U.S. patent applications, related by subject matter to this application, are hereby for all purposes incorporated by reference into this application as though fully set forth herein:

U.S. patent application Ser. No. 15/700,210; filed Sep. 11, 2017, entitled Dynamic Scripts for Tele-Agents;

U.S. patent application Ser. No. 15/844,512; filed Dec. 15, 2017, entitled Dynamic Lead Generation;

U.S. patent application Ser. No. 16/157,075; filed Oct. 10, 2018, entitled Semantic Jargon;

U.S. patent application Ser. No. 16/154,718 filed Oct. 9, 2018, entitled Semantic Call Notes;

U.S. patent application Ser. No. 16/177,423 filed Oct. 31, 2018, entitled Semantic Inferencing in Customer Relationship Management;

U.S. patent application Ser. No. 16/183,725, filed Nov. 7, 2018, entitled Semantic CRM Mobile Communications Sessions;

U.S. patent application Ser. No. 16/183,736, filed Nov. 8, 2018, entitled Semantic Artificial Intelligence Agent; and U.S. patent application Ser. No. 16/198,742 filed Nov. 21, 2018, entitled Semantic CRM Transcripts from Mobile Communications Sessions.

BACKGROUND

Customer Relationship Management ('CRM') is an approach to managing a company's interaction with current and potential customers. CRM implements data analysis of customers' history with a company to improve business relationships with customers, specifically focusing on customer retention and sales growth. CRM systems compile data from a range of communication channels, including telephone, email, live chat, text messaging, marketing materials, websites, and social media. Through the CRM approach and the systems used to facilitate it, businesses learn more about their target audiences and how to best address their needs.

Enterprise CRM systems typically are huge. Such systems can include data warehouse technology, used to aggregate transaction information, to merge the information with information regarding CRM products and services, and to provide key performance indicators. CRM systems aid managing volatile growth and demand and implement forecasting models that integrate sales history with sales projections. CRM systems track and measure marketing campaigns over multiple networks, tracking customer analysis by customer clicks and sales.

In view of their sheer size, CRM systems today tend to lack the infrastructure to make full use of the information they can access. A single tele-agent, working in a contact center supporting a hundred agents, is tasked to operate across several, or even many, client CRM systems, each having different interfaces. The need to learn many interfaces is an inefficient use of agent time. The need to operate across many interfaces slows the agent's workflow. The need to learn many interfaces increases risk of error.

DETAILED DESCRIPTION OF EXAMPLE EMBODIMENTS

Figure 1:
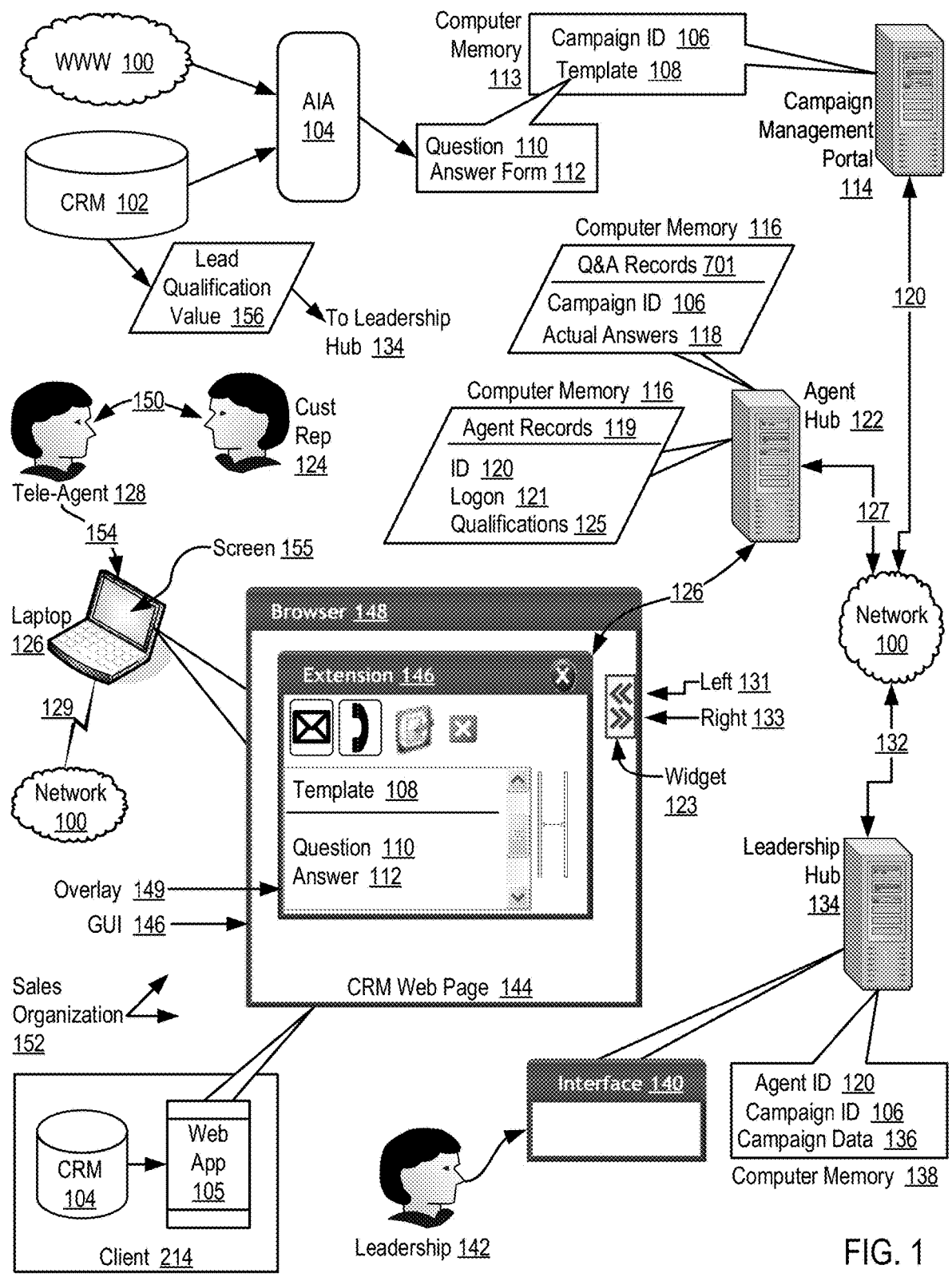
FIG. 1 sets forth a network diagram illustrating an example system of automated computing machinery that agnostically augments a customer relationship management ("CRM") application according to embodiments of the present invention.

Example methods and apparatus of automated computing machinery including a display screen are described with reference to the accompanying drawings, beginning with FIG. 1. FIG. 1 sets forth a network diagram illustrating an example system of automated computing machinery that includes a display screen according to embodiments of the present invention. 'Automated computing machinery' is a device built with a computer processor connected to computer memory that contains program instructions that operate the processor and data for the processor to process. Automated computing machinery includes computers, of course, such as, for example, laptop (126). In this example also, the campaign management portal (114), the agent hub (122), and leadership hub (134) are server-type computers each of which is built upon computer processors controlled by computer program instructions disposed in computer memory. Network (100) is also automated computing machinery, composed of one or more routers each of which is built with one or more computer processors controlled by computer program instructions disposed in computer memory. Client CRM application (104) and sales organization CRM application (102) are also implemented with automated computing machinery.

Three broad categories of entity are represented in the example of FIG. 1, a sales client (214), a sales customer (124), and a sales organization (152). The client (214) hires the sales organization (152) to administer a sales campaign to sell products or services to customers. Customers generally are represented here by a customer representative (124). The term 'customer' is used here to include not only customer actually purchasing, but also contacts, leads, prospects, and the like.

A tele-agent (128), sometimes referred to in this paper simply as an 'agent,' communicates (150) with the customer representative (125). The communication (150) is by telephone, email, text message, meetings in person, or otherwise, and so on. The agent (128) is hired as an employee or consultant by the sales organization to work as a salesperson on a sales campaign for the client. The term 'tele-agent' or merely 'agent' is used in this paper to indicate several possible roles, including for example, business development representative, inside sales rep, inbound sales rep, sales development rep, lead development rep, lead response rep, marketing qualification rep, market response rep, account development rep, account executive, sales executive, and so on, and so on, with all such called here 'tele-agent' or 'agent.'

The sales organization (152) operates as a call center or contact center that has been hired by a client to conduct sales campaign for client products or services. The sales organization itself can be a sales or marketing department in a larger organization, so that its clients are other departments within the same overall company. The sales organization also is frequently an independent contractor or consultant having only a contractual relationship with the client. The sales organization in this example includes all the elements of FIG. 1 except the client (214), the client CRM application (104), and the customer representative (124).

The overall sales organization system in the example of FIG. 1 is composed primarily of the agent hub (122), the campaign management portal (114), and the leadership hub (134), all operatively coupled for data communications through network (100). The agent hub (122) is a module of automated computing machinery configured with computer memory (119) that associates an identity of a tele-agent (120), the tele-agent's qualifications (125), and an indication (121) whether the tele-agent is logged on to the agent hub. The agent hub is operatively coupled for data communications to a browser (148), the browser bearing a browser extension (146) through which a sales template for a sales campaign to which the tele-agent is assigned to work is operatively exposed as an overlay (149) upon a graphical user interface (146) of the browser, the overlay overlaid upon a web page (144) of the CRM application (104).

The agent hub is labeled 'the agent hub' because it is the principal point of contact between an agent and the overall system. The agent hub takes the agent's ID from a logon, and from the agent's point of view, promptly displays on the agent's browser a template with questions and answers forms for use by the agent in working on a campaign to which the agent is currently assigned. Transparent to the agent is the fact that the agent hub first queried the leadership hub for a campaign ID and then queried the campaign management portal for the template. The agent merely sees that she logged on and now has a displayed template for her campaign.

In the example machinery of FIG. 1, the agent hub is operatively coupled for data communications through network (100) to the leadership hub (134), which is configured with computer memory (138) that associates the tele-agent (120) and a sales campaign (106) to which the tele-agent is assigned to work. The leadership hub (134) is labeled 'the leadership hub' because it is the principal point of contact between leadership (142) and the overall system of the sales organization for purposes of agnostic CRM augmentation. The leadership hub is the prime repository of campaign information, clients, products, campaign duration, geographic scope, agent assignments, supervisor and management assignments, and so on. The leadership hub exposes an interface (140) for leadership access to campaign data. For the purposes of leadership, supervisors, managers, executives, and the like, the leadership hub is the primary face of the overall system of the sales organization as it pertains to agnostic CRM augmentation.

In the example machinery of FIG. 1, the agent hub also is operatively coupled for data communications through network (100) to a campaign management portal (114), which is configured with memory (113) that associates the sales campaign (106) and the display template (108), the display template in turn associating a question (110) and an answer form (112). The campaign management portal is labeled 'the campaign management portal' because it provides the template materials, questions and answer forms, and other items, for actual use in campaign administration, the actual substantive conduct of a sales campaign, communication between an agent and a contact, prospect, or customer. The campaign management portal provides the substantive material that supports the agnostic augmentation of a CRM application with pertinent questions and answer forms in direct support of actual real-time sales activity, communications with contacts, prospects, and customers.

In the example machinery of FIG. 1, the agent hub also is operatively coupled for data communications through network (100) to a computer, laptop (126), running the browser (148). The laptop is coupled for data communications to the network (100) through wireless connection (129).

The automated computing machinery in the example of FIG. 1 operates generally so as to agnostically augment a CRM application (104) first by accepting a logon from a tele-agent (128). The tele-agent operates a browser (148) on a laptop (126). The machinery in the example of FIG. 1 is configured with a sales template (108) of a sales campaign (106) displayed by a browser extension (146) on the display screen (155) as an overlay (149) upon a web page (144) of a customer relationship CRM application (104). The template so displayed includes a question (110) and an answer form (112) for the question, with the question and the answer form being pertinent to the sales campaign (106). The machinery in the example of FIG. 1 is configured with template functions (110, 112) additional to functionality of the CRM application (104). The template exposes such additional functionality through graphical user interface ("GUI") widgets of the template as displayed on the display screen. The template implements such additional functionality identically for disparate CRM applications. The question (110) and answer form (112) represent functionality additional with respect to functionality provided by the client CRM (104). Other examples of such additional functionality include display and maintenance of sales goals both global, team, and individual; maintenance and display of bonus, both total available bonus and bonus actually earned, available to an agent for work on a particular campaign; maintenance and display of leaderboards with goals and actual performance, and the like, all of which is additional functionality of the automated machinery of the sales organization (152), none of which is included within the client CRM application (104).

The browser (148) operates a browser extension (146) obtained from an agent hub (122) or optionally from some other source. A browser extension is a software module, typically source code, installed in the browser, customizing the browser, providing a user interface modified to display on the display screen (155) a sales template for a sales campaign and present the same interface for the template even across navigation of the browser among web pages. The browser is free to navigate pages of a web application, for example, while the interface exposed by the browser extension remains exactly the same.

The extension can be thought of as a modified browser screen that remains stable even as the browser navigates among many other web pages, changing its display for each web page, always maintaining the same display from the extension. The browser extension (146) in embodiments is implemented in source code of HTML, JavaScript, or CSS, by which the browser extension implements functionality additional to the functionality of the CRM application (104). Such additional functionality is provided for a CRM application active or running in the browser, and the browser extension provides such additional functionality identically for disparate CRMs. Such additional functionality is provided for a CRM application active or running in the browser, and the browser extension provides such additional functionality identically for disparate CRMs that are implemented at least partly as web applications regardless of the structure or function of such CRMs.

The tele-agent (128) logs on through the browser extension (146) to the system organized on network (100) to include the agent hub (122), the campaign management portal (114), and the leadership hub (134). The agent hub maintains Boolean indications (121) whether each agent (120) is logged onto the system. With the tele-agent logged in, the agent hub retrieves from the leadership hub (134) the campaigns to which the agent is assigned for work. The agent hub provides the agent ID to the leadership hub which looks up associated campaign IDs (106) in computer memory. If the agent is assigned to more than one campaign, the agent hub allows the agent to select one to work on. The agent hub then provides the campaign ID to the campaign management portal, which retrieves a sales template (108) in dependence upon the campaign ID. The agent hub then installs the template in the browser extension (146), and the agent uses the questions and answer forms in the template to discuss sales with a customer representative (124).

In the example of FIG. 1, the client's CRM (104) exposes its contents to the sales organization through a web application (104). A web application, or web app, is an application program that is stored on a remote server and delivered over the internet through a browser. The web app is a client-server computer program that the client, including the user interface and client-side logic, runs in a web browser. Such web apps in some embodiments are composed of one or more dynamic web pages having functionality similar to a desktop software application, or to a mobile app. Web apps can be loaded as web pages, but can accept input and store data locally. Web apps can be composed of multiple web pages operating in coordination or can operate as a single page against a single URL.

In the example of FIG. 1, the browser (148) is navigated to a web page (144) of the web app (105). The template (108) exposed through the browser extension (146) as an overlay (149) on the GUI (146) of the laptop (126) maintains exactly the same form and content throughout a campaign across all web pages (144) of the web app (105) of the client's CRM (214). This alleviates the burden on the tele-agent to disembed pertinent information from the client's CRM. The content of the template will change when the agent directs attention to a campaign of a different client, but the overall form of the template and the overall structure of its content questions and answer forms again will remain constant across all the web pages of the web app of the new client and the new client's campaign, thus also reducing the burden on the agent to know the details of two or more client CRMs.

The questions (110) in the template (108) are suggestions, keyed to a campaign (106), for the tele-agent to use in communicating with a customer representative. Examples include:

"I see from your recent announcements that you are beginning production of road graders in addition to your usual lines of front end loaders. We have in the past provided motors for your loaders, and we think we have new production that will fit your graders. Can I send you some literature?"

"I see from your recent announcements that, in addition to your usual inventory control products, you are branching out into general ledgers. We have a current generation accounting engine specifically designed as a generic engine for posting outlying accounts into any general ledger. Can I send you some literature?"

"I see from your recent ads that you are beginning production of switching power supplies in addition to your usual line of linear products. Our engineers recently designed and we now produce smoothing filters oriented specifically to the high-frequency noise components output from the switching process. Can I send you some literature?"

The answer forms (112) in the template (108) are forms or widgets without content, radio buttons, drop-down menus, data entry fields, and the like. Actual answers (118) are composed of pressed radio buttons, selections from drop-down menus, text entered in data entry fields, and so on. To the extent that actual answers to questions flow from communications (150) with the customer rep (124), the actual answers (118) are stored in association with the pertinent campaign ID (106) in computer memory (116) of the agent hub (122).

The questions (110) and answer forms (112) in the template (108) can be created as data entry by someone with knowledge of the products to which a campaign is directed or knowledge of the industry in which a sales campaign is disposed. In the example of FIG. 1, however, the questions and answer forms in the template are data mined by an artificial intelligence agent (104) from information found in the world wide web (100) and in the sales organization's own customer relationship management system (102).

As described in more detail below with regard to the example process illustrated in FIG. 5, the leadership hub in embodiments can create and populate data structures in computer memory (138) of a new campaign (106), including IDs of agents assigned to the campaign as well as additional campaign data such as products, client, duration, scope, and so on. The leadership hub can create a new campaign based upon a lead qualification value (156) provide by a CRM (102) internal to the sale organization. In addition to sourcing new campaigns and new campaign data from internal automation, in embodiments as in this example, a leadership hub can expose an interface (140) and accept input through the interface to create or edit campaigns among computer memory of the hub. In this example, campaign configuration is accepted through an interface (140) from campaign leadership (142). Campaign configuration from leadership (142) by data entry through interface (140) enters computer memory (138) of the leadership hub (134) with a campaign ID (106), an agent ID for at least one agent assigned to work on the campaign, and additional descriptive campaign data (136). Leadership (142) in this example is any employee or consultant of the sales organization (152) with knowledge of the campaign and data entry authority on the leadership hub, including, for example, a sales team leader, a unit supervisor, a department manager, a sales executive, or the like. Additional campaign data (136) includes, for example, a campaign name, identity of a client for whom the campaign is implemented, roles of persons assigned to work on the campaign, duration of the campaign, geographic scope of the campaign, and products for sale in the campaign.

The leadership hub (134) and the campaign management portal (114) are operative to display the template (108) as an overlay (149) of a web page (144) of a CRM (104). An overlay as the term is used here refers to a GUI window operated by the browser under control of an extension that is displayed within the browser's on top of everything else in the browser's window. The extension provides a GUI widget (123) that can be invoked through the GUI to display the overlay or remove the overlay from the display. Displaying the overlay at least partly obscures the display of items overlaid. Removing the overlay restores full display of the underlying items in the browser window. While the overlay is displayed, it implements full functionality as a GUI window for display of template data and acceptance of input data through the interface. The display of the overlay is based upon the agent's ID (120). The leadership hub identifies, to the campaign management portal through the agent hub, a campaign ID (106) of a campaign to which the agent is assigned, and the campaign management hub provides to the agent hub for display a sales template (108) bearing questions (110) and answers (112) for a sales campaign. The sales template is then displayed in an overlay (149).

In this example, the control widget for the display of the overlay includes two control button, one points left (131) and one right (133). In embodiments, both control buttons can be exposed at all time, when a mouse-click on left (131) will display the overlay, and a mouse-click on right (133) will remove the overlay. In other embodiments, only the left control is displayed when the overlay is removed, and only the right button is displayed when the overlay is displayed. The display screen (155) displays a graphical user interface ("GUI") (146), and a pertinent web page (144) is displayed through the GUI, with the template (108) displayed as a GUI overlay (149) upon the web page. The web page (144) is a page in a web application (105) that exposes contents of a CRM (104) to the sales organization (152) including tele-agent (128).

In the example of FIG. 1, the template (108) is displayed as an overlay (108) in the same form across any web page of any CRM implemented as a web application or whose contents are exposed through a web app. The agent can, for example, navigate through a browser web pages of a web app of a client for a sales campaign and have available at all times on any web page the same form a template with questions and answers appropriate for that sales campaign. The template is functional in this way for disparate CRMs implemented as a web applications regardless of the structure or function of an individual CRM. In the example of FIG. 1, neither the hub (134) nor the portal (114) have any information, knowledge, nor any data regarding the structure or function of the CRM (104). In the example of FIG. 1, the machinery implements an interface neither between the CRM (104) and the hub (134) nor between the CRM (104) and the portal (114). That is, in the machinery of FIG. 1 with the screen (155) displaying the template (108), the template so displayed includes no data regarding the structure or function of the CRM application, the display screen displaying the template implements no interface between the CRM application and the template, and the display screen so displaying the template agnostically augments the CRM application.

In view of this explanation, it can now be seen that 'agnostically' means that the computing machinery in the example of FIG. 1 operates for disparate CRMs exposed through web apps regardless of the structure or function of a particular CRM, with no knowledge of the structure or function of the CRM, and with no interface to the CRM. The machinery of FIG. 1 includes large quantities of memory, campaign management portal memory (113), leadership hub memory (138), the agent hub maintains agent information (120, 121, 125) in computer memory, and so on. All this memory includes not one byte or bit describing the client's CRM (104). In the machinery of FIG. 1, the CRM (104) is exposed through a web app (105) on a normal browser screen (148) to an agent using the browser. The machinery of FIG. 1 uses the browser to implement a browser extension (146) that in turn implements an overlay (149) that displays a template (108) of the system. Nevertheless, there is no interface or connection or communications or sharing of data between the client CRM (104) and the computing machinery of the sales organization. With respect to the CRM (104), the machinery of FIG. 1 knows nothing. The machinery of FIG. 1 is agnostic with respect to the client's CRM (104).

Computer memory (113, 116, 138) in the example of FIG. 1, and in subsequent drawings also, is depicted as entities of example computer hardware, computers or servers (114, 122, 134). Readers will recognize, however, that this depiction is only for ease of explanation, not for limitation. Computer memory according to embodiments can be implemented in multiple computers or servers, hundreds of disk drives in a data center, high speed disk networks, cloud storage, and so, and so on.

Figure 2:
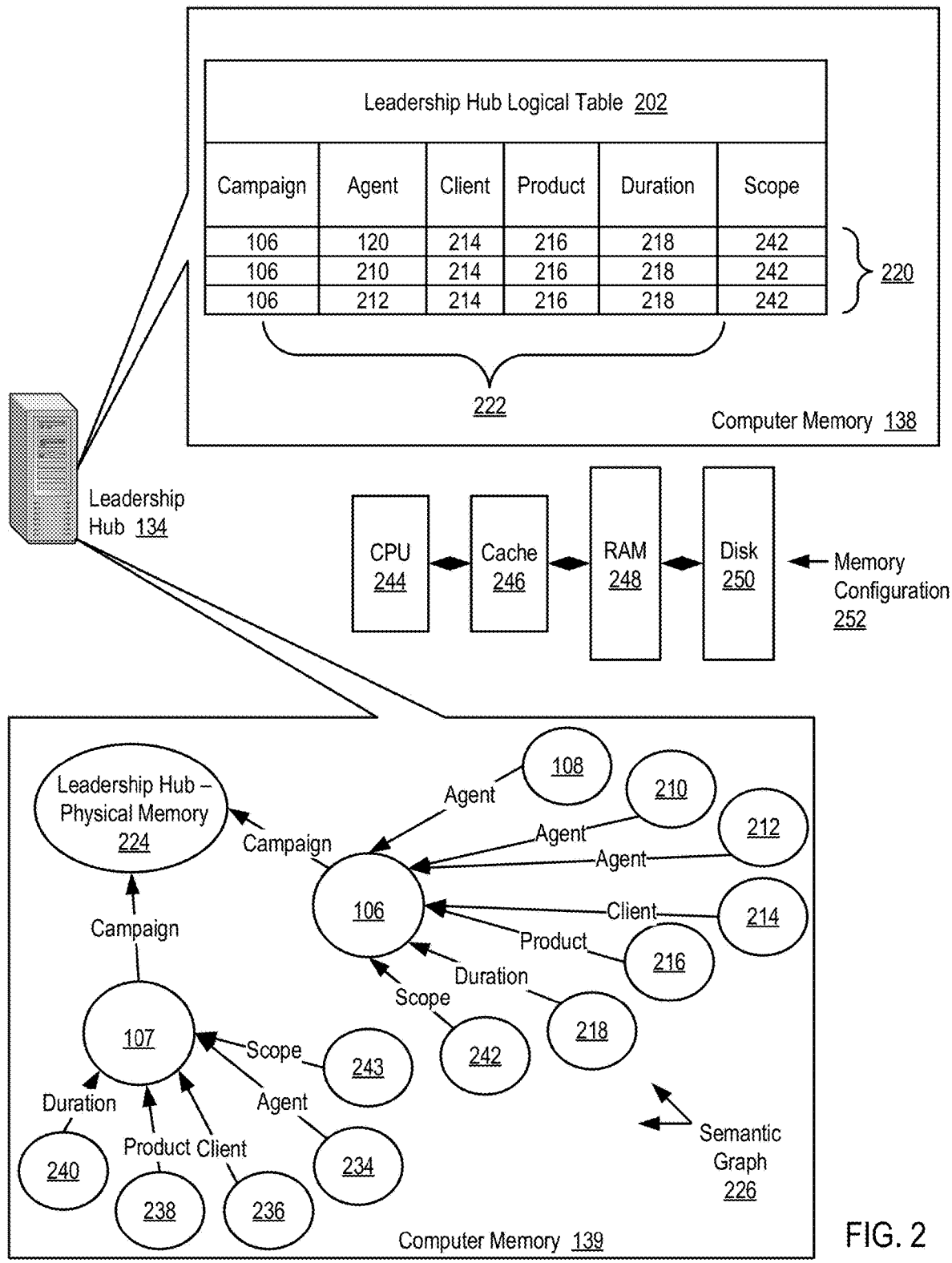
FIG. 2 illustrates computer memory of a leadership hub configured according to embodiments of the present invention.

For further explanation, FIG. 2 illustrates computer memory (138, 139) of a leadership hub (134) configured according to embodiments of the present invention. The leadership hub (134) in the example of FIG. 2 is a module of the automated computing machinery, that is a computer or server operated by at least one computer processor coupled for data communications to computer memory. In the example of FIG. 2, the computer memory (138) is configured according to a logical table (202) The table includes a number of logical columns (222) including a column identifying sales campaigns (106) and a column identifying tele-agents (120, 210, 212). The table also includes logical rows (220), each row representing an assignment of a tele-agent to work on a sales campaign. In addition to the columns for campaign and agent, the table includes also columns identifying a client (214), products (216) subject of a sales campaign, a duration of a campaign (218), and geophysical scope of a campaign (242).

The rows (220) in the example of FIG. 2 serve to associated agents with a campaign. Storing client, product, duration, and scope with each association of an agent and a campaign represents some redundancy of storage. Readers will recognize that the redundancy can be reduced by placing the agent IDs in a separate sub-table accessed by use of the campaign ID as a foreign key. Tables associated by foreign keys, one-to-many relations, many-to-one relations, and so on, are all included within the meaning of 'logical table' as the term is used in this paper.

In addition to the logical table (202), FIG. 2 also sets forth an example of memory physically configured as a semantic graph (226) in the computer memory (139) of the leadership hub (134). A semantic graph is a configuration of memory that uses graph structures, nodes and edges, to represent and store data. A key concept of this kind of configuration is the graph (or edge or relationship), which directly relates data items in a data store. Such a graph database contrasts with more conventional storage such as a logical table, where links among data are mere indirect metadata, and queries search for data within the store using joins to collect related data. Semantic graphs, by design, make explicit relations among data that can be difficult to model in relational systems or logical tables.

The semantic graph (226) in the example of FIG. 2 illustrates a physical arrangement of campaign (106) and an additional campaign also, (107). The semantic graph of campaign (106), just as was effected by the logical table (202), also associates tele-agents (108, 210, 220) with the campaign (106). In addition, in the semantic graph of campaign (106), data describing the client (214), product (216), duration (218), and physical scope (242) each are stored only once, thus reducing the inefficient redundancy evidenced in the logical table (202). In some embodiments, a logical table is easier to comprehend and manipulate. In a logical table, however, the identification of data elements, campaign, agent, client, product, and so on, is meta-data, typically required to be known to a programmer before accessing the data. In the semantic graph, the semantic definition of each data element (108, 214, 216, and so on) is built into the graph edge that associates the data element with the campaign, "agent," "client,", "product," and so on. So in the semantic graph, the meta-data explaining the data content is itself an element of the content.

For further explanation, notice that the arrangement of nodes and edges in the semantic graph of FIG. 2 can be characterized as semantic triples. A semantic triple is a three-part statement expressed in a form of logic. Depending on context, different terminologies are used to refer to effectively the same three parts of a statement in a logic. In this paper, the elements of a triple are referred to as subject, predicate, and object. Thus the semantic triple that includes the node campaign (106) connected by the edge labeled "Agent" to node (108) is expressed as a semantic triple as:
  subject: campaign (106)
  predicate: has an assigned agent
  object: agent (108)

The association of the campaign (106) and the client for the campaign can be expressed as the semantic triple:
  subject: campaign (106)
  predicate: is for a client
  object: client (214)

The association of the campaign (106) and a product that is a subject of the campaign can be expressed as the semantic triple:
  subject: campaign (106)
  predicate: sells a product
  object: product (216)

And so on, for all the data relations in semantic graph (226).

The identifications of sales campaigns and tele-agents in the leadership hub, as well as other information in the computer memory of the leadership hub, are, in some embodiments at least, physically configured as semantic triples in contiguous segments of the computer memory of the leadership hub. 'Contiguous' means storage of the data content of semantic triples adjacent to one another sequentially in physical memory. Contiguous memory is explained in more detail with reference to the physical memory configuration (252) of FIG. 2. Memory configuration (252) sets forth a block diagram of a computer memory system, configured supportive of physical memory according to embodiments, that includes a computer processor ("CPU") (244) coupled for data communications to cache memory (246), random access memory ("RAM") (248), and disk memory (250). In accessing physical memory, the CPU looks first in the cache. Upon a cache miss, the CPU seeks memory content in RAM (248) and moves it into the cache. Failing to find sought content in RAM, a failure termed a "page fault," the CPU looks all the way out to the disk (250), moves content into RAM (248) and then into cache (246).

For a pertinent set of triples, a subgraph, for example, previously stored, composed of 10 kilobytes of storage, some computer systems today support memory page sizes of a megabyte or more. Such a set of triples can be stored in a single memory page, and, once that page is in RAM, operation of the triple set for CRM can proceed with no risk of page faults at all. Cache misses would still be required to load the contents into cache, but, with the entire triple set in RAM, the cache misses would not risk page faults. The inventors estimate that after a short period of operation, the cache miss rate would be less than one percent for operation of such a set of triples in the context of CRM. That is, when a set of triples is disposed in contiguous memory in support of CRM according to embodiments of the present invention, memory access times generally will approximate cache access times, just a few nanoseconds, for more than 99% of memory access.

Figure 3:
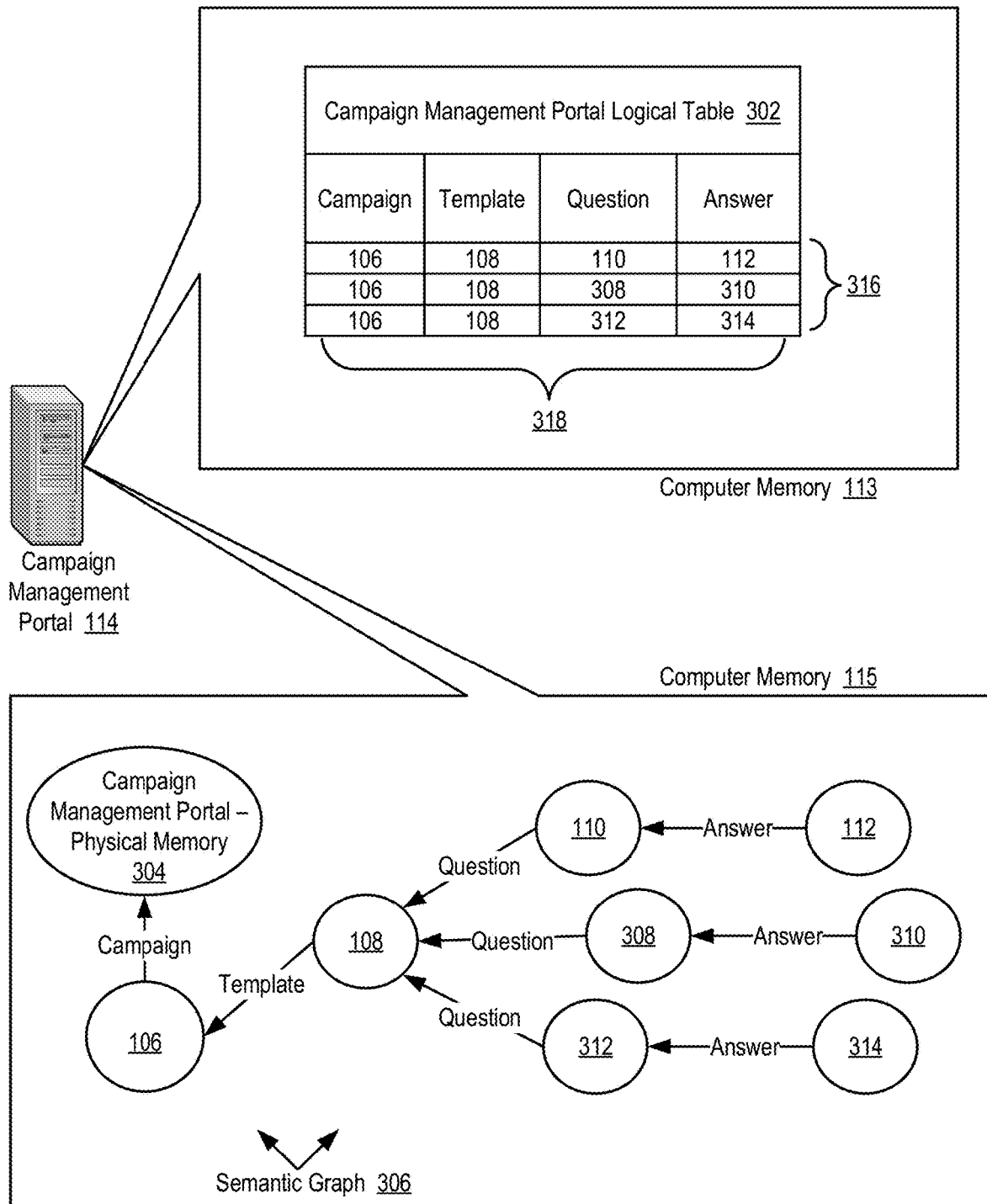
FIG. 3 illustrates computer memory of a campaign management portal configured according to embodiments of the present invention.

For further explanation, FIG. 3 illustrates computer memory (113, 115) of a campaign management portal (114) configured according to embodiments of the present invention. The campaign management portal (114) in the example of FIG. 3 is a module of the automated computing machinery, that is a computer or server operated by at least one computer processor coupled for data communications to computer memory. In the example of FIG. 3, the computer memory (113) is configured according to a logical table (302). The table includes a number of logical columns (318) including a column identifying sales campaigns (106) and a column identifying display templates (108).

The table also includes logical rows (316). Each row in this example associates a sales campaign (106) and a display template (108) that also associates at least one sales campaign question (110, 308, 312) and an answer form (112, 310, 314) for the question. The answer forms (112, 310, 314) associated with template (108) are forms without content, radio buttons, drop-down menus, data entry fields, and the like. Actual answers are composed of pressed radio buttons, selections from drop-down menus, text entered in data entry fields, and so on. Actual answers are stored in association with the pertinent campaign ID (106) in computer memory of an agent hub (118 on FIG. 1).

In addition to the logical table (302), FIG. 3 also sets forth an example of memory physically configured as a semantic graph (306) in the computer memory (115) of the campaign management portal (114). The semantic graph (306) in the example of FIG. 3 illustrates a physical arrangement of memory for a campaign (106), an associated template (108), associated questions (110, 308, 312), and associated answer forms (112, 310, 314). In the semantic graph (306) associating questions and answer forms with a template of a campaign, the campaign data (106) and the template data (108) are stored only once, thus reducing the redundancy evidenced in the logical table (302) where campaign data (106) and template data are stored three time, once for each combination of question and answer form.

The arrangement of nodes and edges in the semantic graph of FIG. 3 can be characterized as semantic triples, where, for example, the triple that includes the campaign (106) and the template (108) can be expressed as:
  subject: campaign (106)
  predicate: has a template
  object: template (108)

The association of the template (108) and the first question can be expressed as:
  subject: template (108)
  predicate: has a question
  object: question (110)

The association of the question (110) and answer form (112) can be expressed as the semantic triple:
  subject: question (110)
  predicate: has an answer form
  object: answer form (112)

And so on, for all the data relations in semantic graph (306).

The identifications of sales campaigns (106) and display templates (108), including sales campaign questions (110, 308, 312) and answer forms (112, 310, 314), are, in some embodiments at least, physically configured as semantic triples in contiguous segments of the computer memory of the campaign management portal. Contiguous memory is explained in more detail above in this paper with reference to the physical memory configuration (252) of FIG. 2.

Figure 4:
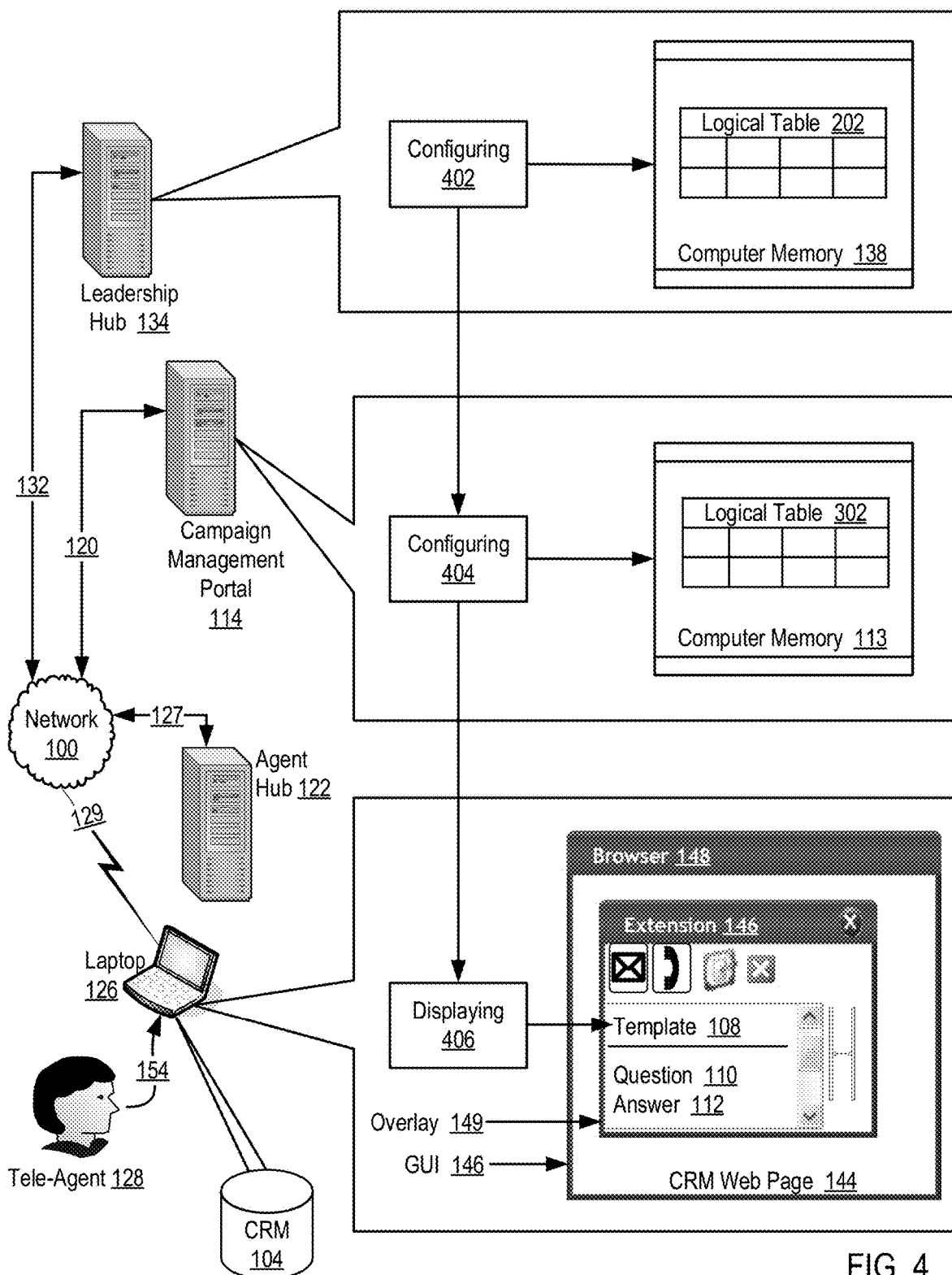
FIGS. 4-6 set forth flow charts illustrating example methods of agnostically augmenting a CRM application according to embodiments of the present invention.

For further explanation, FIG. 4 sets forth a flow chart illustrating an example method of agnostically augmenting a customer relationship management ("CRM") application according to embodiments of the present invention. 'Agnostically' means that the method of FIG. 4 operates for disparate CRMs exposed through web apps regardless of the structure or function of a particular CRM, with no knowledge of the structure or function of the CRM, and with no interface to the CRM. In the method of FIG. 4, the CRM (104) is exposed on a normal browser screen (148) to an agent using the browser. The method of FIG. 4 uses the browser to implement a browser extension (146) that in turn implements an overlay (149) that displays a template (108) of the method. Nevertheless, there is no interface or connection or communications or sharing of data or information between the CRM and the method of FIG. 4. With respect to the CRM, the method of FIG. 4 knows nothing. The method of FIG. 4 is agnostic with respect to the CRM (104).

The method of FIG. 4 includes configuring (402) by a leadership hub (134) computer memory (138) of the hub according to a logical table (202). The contents of the table (202), illustrated on FIG. 2, include a number of logical columns (222) including a column identifying sales campaigns (106) and a column identifying tele-agents (120, 210, 212). The table also includes logical rows (220), each row representing an assignment of a tele-agent to work on a sales campaign.

The method of FIG. 4 also includes configuring (404) by a campaign management portal (114) computer memory (113) of the portal according to a logical table (302). The table is explained above with respect to FIG. 3 as including a number of logical columns (318) including a column identifying sales campaigns (106) and a column identifying display templates (108). The table (302) also includes logical rows (316). Each row in this example associates a sales campaign (106) and a display template (108) that also associates at least one sales campaign question (110, 308, 312) and an answer form (112, 310, 314) for the question.

The method of FIG. 4 also includes displaying (406) by the leadership hub (134) and the campaign management portal (114) a template (108) as an overlay (149) on a web page (144) of a CRM (104). A tele-agent runs a browser (148) on a computer such as laptop (126). The browser is navigated to a web page (144) of a web app exposed by a client CRM (104). The browser runs a pre-installed extension (146) that is capable of displaying a template (108) with questions and answer forms, retrieving actual answers, and providing actual answers to the agent hub for storage. Through the extension (146), the agent logs on to the agent hub, which provides the agent's ID to the leadership hub (134). The leadership hub identifies to the campaign management portal (114) a campaign on which the agent is authorized to work. The campaign management portal provides to the agent hub a template for the identified campaign. The agent hub provides the template to the browser extension. The tele-agent uses the contents of the template to communicate with prospects, purchasers, and other customer representatives. Thus the leadership hub and the campaign management portal coordinate by use of the agent hub the display of the template.

Figure 5:
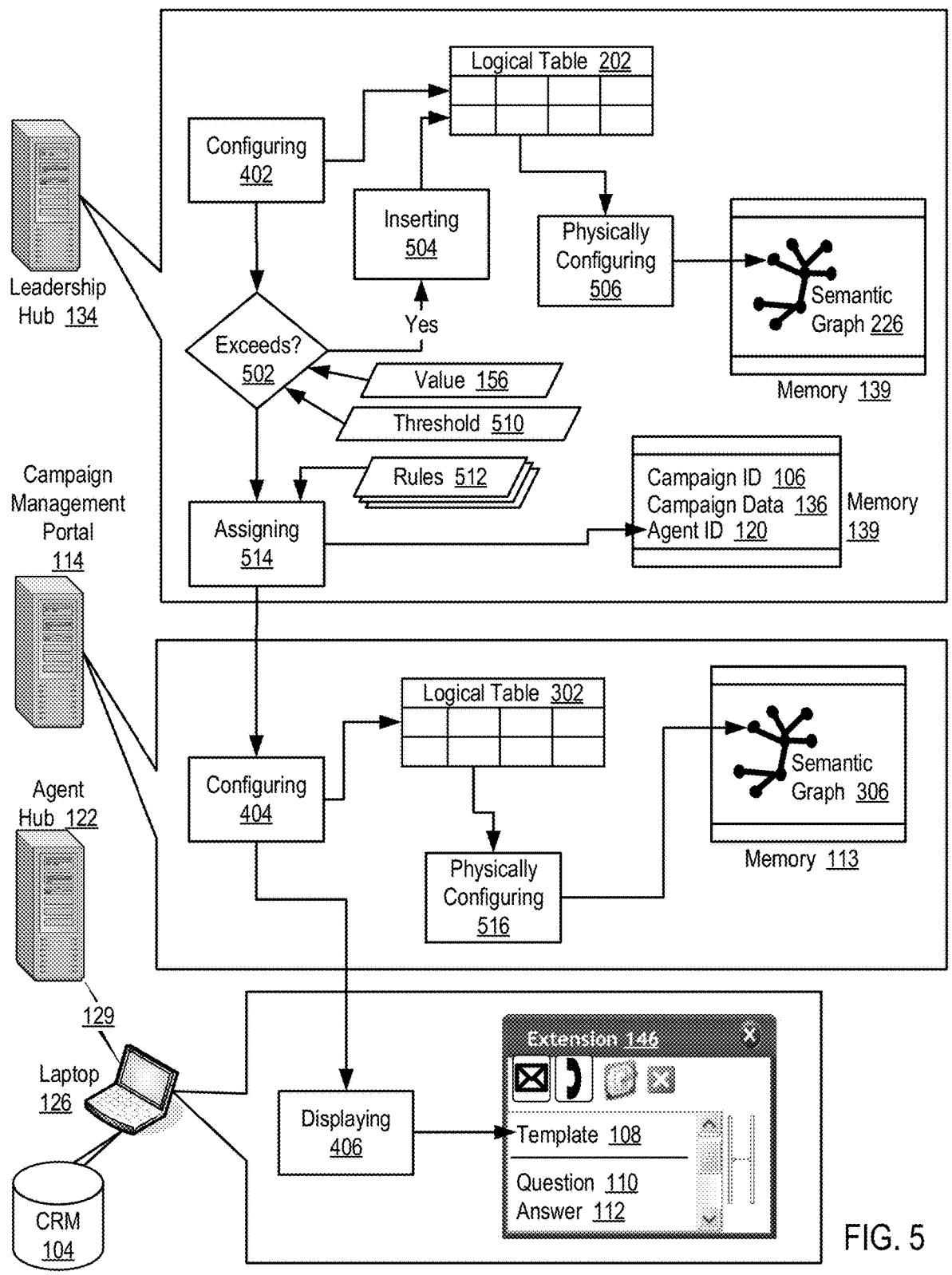

For further explanation, FIG. 5 sets forth a flow chart illustrating a further example method of agnostically augmenting a CRM application according to embodiments of the present invention. The method of FIG. 5 is similar to the method of FIG. 4, including as it does configuring (402) computer memory of a leadership hub (134) according to a logical table (202), configuring (404) computer memory (113) of a campaign management portal (114) according to a logical table (302), and displaying (406) a template (108) as an overlay on a web page of a CRM (104).

The method of FIG. 5, however, also includes physically configuring (506) by the leadership hub (134) the identifications of sales campaigns (106 on FIG. 2) and tele-agents (120, 210, 212 on FIG. 2) as a semantic graph (226) in the computer memory (139) of the leadership hub (134) and physically configuring (516) by the campaign management portal (114) the identifications of sales campaigns (106 on FIG. 3) and display templates (108 on FIG. 3), including sales campaign questions (110, 308, 312 on FIG. 3) and answer forms (112, 310, 314 on FIG. 3), as a semantic graph (306) in the computer memory (113) of the campaign management portal (114). Thus the leadership hub and the campaign management portal both have available when needed both the benefits of logical tables and the benefits of semantic graphs.

The method of FIG. 5 also includes inserting (504), when a lead qualification value (156) exceeds (502) a predetermined threshold (510), in computer memory of the leadership hub a new logical row for a new campaign. Lead qualification values can include, for example, BANT values (Budget Authority Need Timing), CHAMP values (Challenges Authority Money Prioritization), SPIN values (Situation Problem Implication Need-payoff), NEAT values (Need Economic impact, Access to authority, Timeline), MEDDIC values (Metrics, Economic buyer, Decision criteria, Decision process, Identify pain, Champion), and so on. Lead qualification values can be maintained as part of routine data processing in a sales organization's internal CRM application (102 on FIG. 1) of a sales organization. A value exceeding a threshold can trigger a message to a leadership hub to create a new campaign for a client for a product. The campaign may need additional processing before going active, assignment of resources, perhaps client approval or management approval, but the initial creation of the campaign can be triggered by a lead qualification value.

The method of FIG. 5 also includes assigning (514) by the leadership hub according to business rules (512) an agent (120) to a campaign (106). In this example, the assigning is automated within the hub as naturally following the creation (504) of a new campaign. Examples of business rules include:

assigning an agent whose experience and education match the products that are the subjects of a campaign, assigning an agent as a portion of the agent's availability so that the total assignment of the agent's availability across all campaigns to which the agent is assigned does not exceed 100%, and so on.

Figure 6:
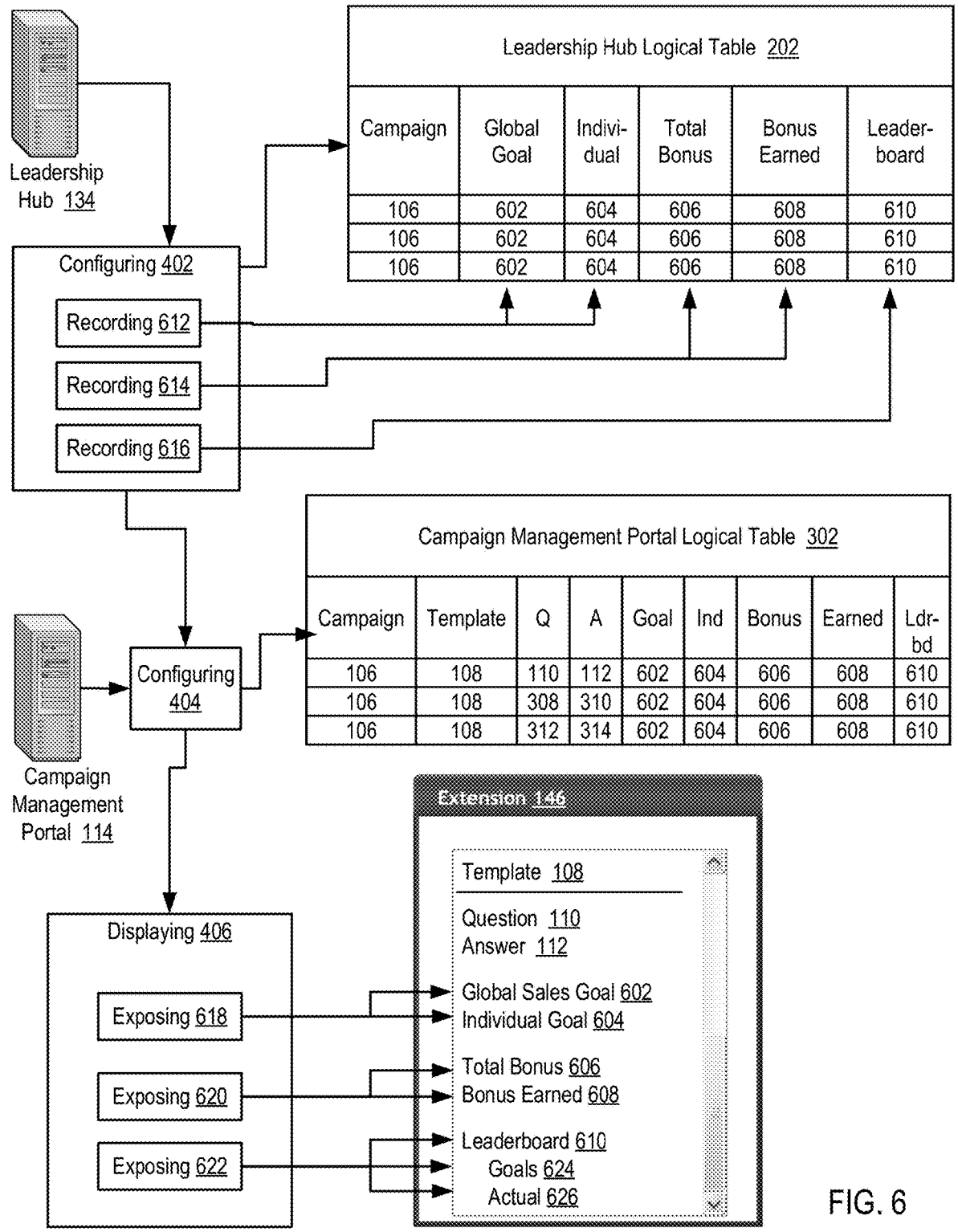

For further explanation, FIG. 6 sets forth a flow chart illustrating a further example method of agnostically augmenting a CRM application according to embodiments of the present invention. The method of FIG. 6 is similar to the method of FIG. 4, including as it does configuring (402) computer memory of a leadership hub (134) according to a logical table (202), configuring (404) computer memory (113) of a campaign management portal (114) according to a logical table (302), and displaying (406) a template (108) as an overlay on a web page of a CRM (104).

The method of FIG. 6, however, also includes recording (612) by the leadership hub (134) as campaign data a global sales goal (602) for a campaign and an individual goal (604) for a tele-agent assigned to work on the campaign, and exposing (618) to the tele-agent through the template (108) both the global sales goal (602) for the campaign and the individual goal (604) for the tele-agent. Examples of sales goals include sales revenue, revenue by product or product line, percentage of revenue from new business, and so on. The method of FIG. 5 also includes recording (614) by the leadership hub as campaign data a total performance bonus (606) for the agent for a campaign and the portion (608) of the total earned by the agent, and exposing (620) to a tele-agent through the template (108) both the total performance bonus (606) for the agent for the campaign and the portion (608) of the total earned by the agent.

The method of FIG. 6 also includes recording (616) by the leadership hub as campaign data a leaderboard (610) comprising performance goals (624) for each agent assigned to the campaign and actual performance (626) by each agent, and exposing (622) to all tele-agents assigned to the campaign the leaderboard (610), including both the performance goals (624) for each agent and actual performance (626) by each agent. The notion of leaderboard goals in some embodiments at least is broader than sales or bonus, including, for example, number of calls made, emails sent, number of conversations, social media interactions, meetings scheduled, demos or sales presentations, proposals sent, opportunities closed, new opportunities added to a sales pipeline, lead response time, leads qualified, email open rate, email response rate, and so on, and so on, the point of the leaderboard being to show overall performance for a team, all the agents assigned to a campaign.

Figure 7:
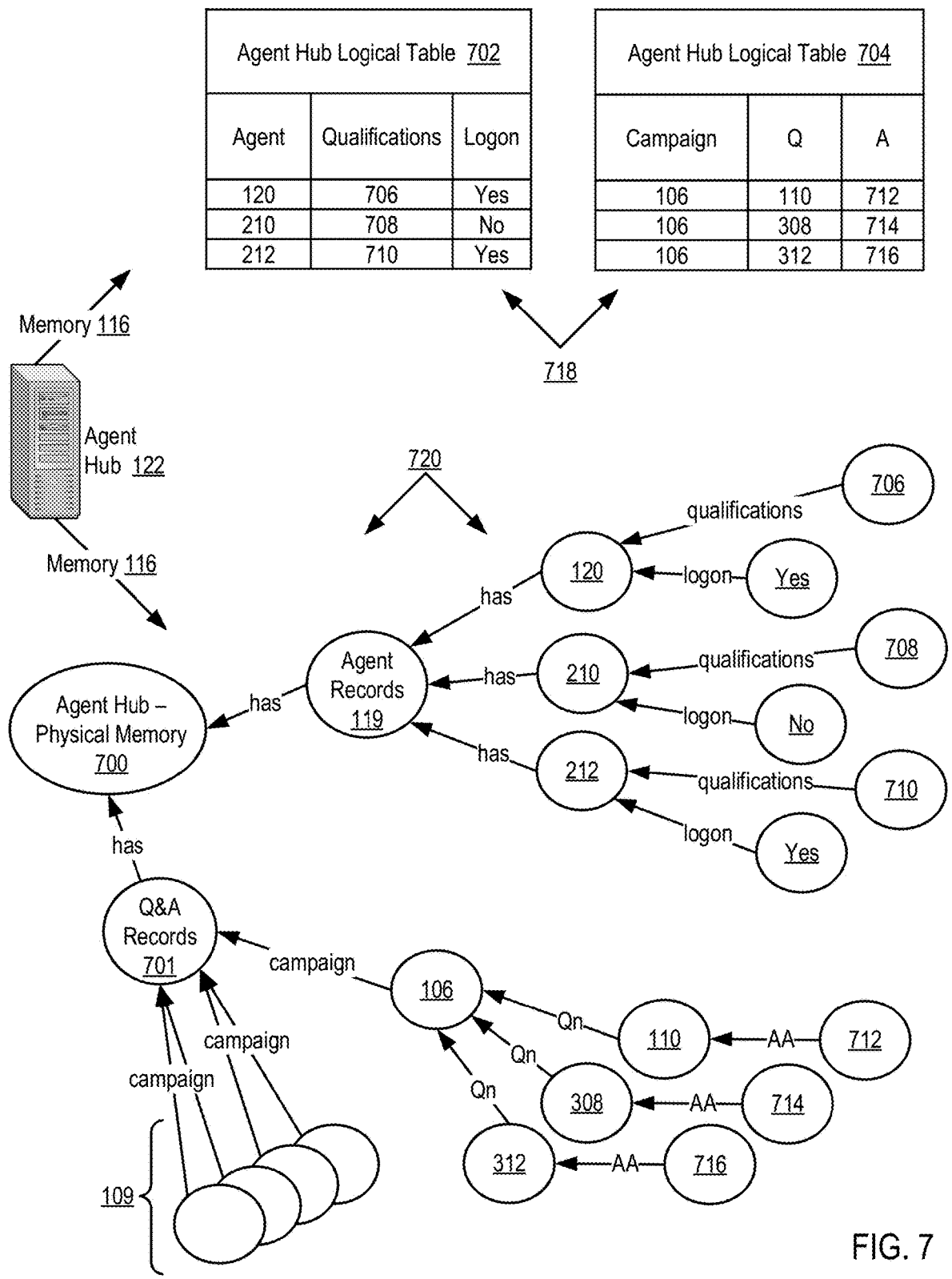
FIG. 7 illustrates computer memory of an agent hub configured according to embodiments of the present invention.

For further explanation, FIG. 7 illustrates computer memory (718, 720) of an agent hub (122) configured according to embodiments of the present invention. The agent hub (122) in the example of FIG. 7 is a module of the automated computing machinery, that is a computer or server operated by at least one computer processor coupled for data communications to computer memory (116). In the example of FIG. 7, the computer memory is configured according to a logical tables (702, 704). Table (702) includes a number of logical columns including a column identifying agents (120, 210, 212), a column that records Boolean values (Yes, No, Yes) indicating whether a corresponding agent is logged on through the agent hub, and a column that records agents' job qualifications (706, 708, 710). Each logical row in table (702) associates an agent, an indication whether that agent is logged on, and that agents' job qualifications for use in assigning that agent to a sales campaign. Agents' job qualifications can include, for example, education, work history, recent sales experience, and so on. Table (704) includes logical columns that record sales campaign identifiers (106), template questions (110, 308, 312), and actual answers (712, 714, 715). Each row in table (704) associates a template question with an actual answer that is responsive to that question and a campaign for which the question is a component of a sales template.

In addition to the logical tables, FIG. 7 also sets forth an example of memory physically configured as a semantic graph (720) in computer memory (116) of the agent hub (122). The semantic graph in the example of FIG. 7 illustrates a physical arrangement of memory for agent records (119) and for question and answer (Q&A) records (701). The agent records include nodes identifying agents (120, 210, 212) each of which has associated indications of logon (Yes, No, Yes) and associated qualifications (706, 708, 710). The Q&A records associate sales template questions (110, 308, 312) with actual answers (712, 714, 716), through edges labeled 'Qn' for the questions and 'AA' for actual answers. FIG. 7 details campaign (106), but details would be similar for multiple campaigns (109) in graph storage. Graph storage instantiates a campaign (e.g., 106) only once, in contrast to table (704) which repeats (106) several times, a storage arrangement that may have advantages for search but is somewhat less efficient than the graph.

The arrangement of nodes and edges in the semantic graph of FIG. 7 can be characterized as semantic triples, where, for example, the triple that includes the campaign (106) and the question (110) can be expressed as:
    subject: campaign (106)
    predicate: has a question
    object: question (110)
The association of the question (110) and its actual answer can be expressed as:
    subject: question (110)
    predicate: has actual answer
    object: answer (712)
The triple defining agent (120) in the agent records can be expressed as:
    subject: agent records (119)
    predicate: has
    object: agent (120)
The triple indicating whether agent (120) is logged on can be expressed as:
    subject: agent (120)
    predicate: logon
    object: Yes
And so on, for all the data relations in semantic graph (720).

The identifications of agents (120, 210, 212), qualifications (706, 708, 710), logons (Yes, No), campaigns (106. 109), questions (110, 308, 312), and actual answers (712, 714, 716) are, optionally at least in some embodiments, physically configured as semantic triples in contiguous segments of the computer memory (116) of the agent hub (122). Contiguous memory is explained in more detail above in this paper with reference to the physical memory configuration (252) of FIG. 2. The computer, laptop (126), runs a browser (148), which in turn runs a browser extension (146), which in turn displays and operates a sales template (108) sourced from the campaign management portal (114) for a sales campaign defined in the leadership hub (134).

Figure 8:
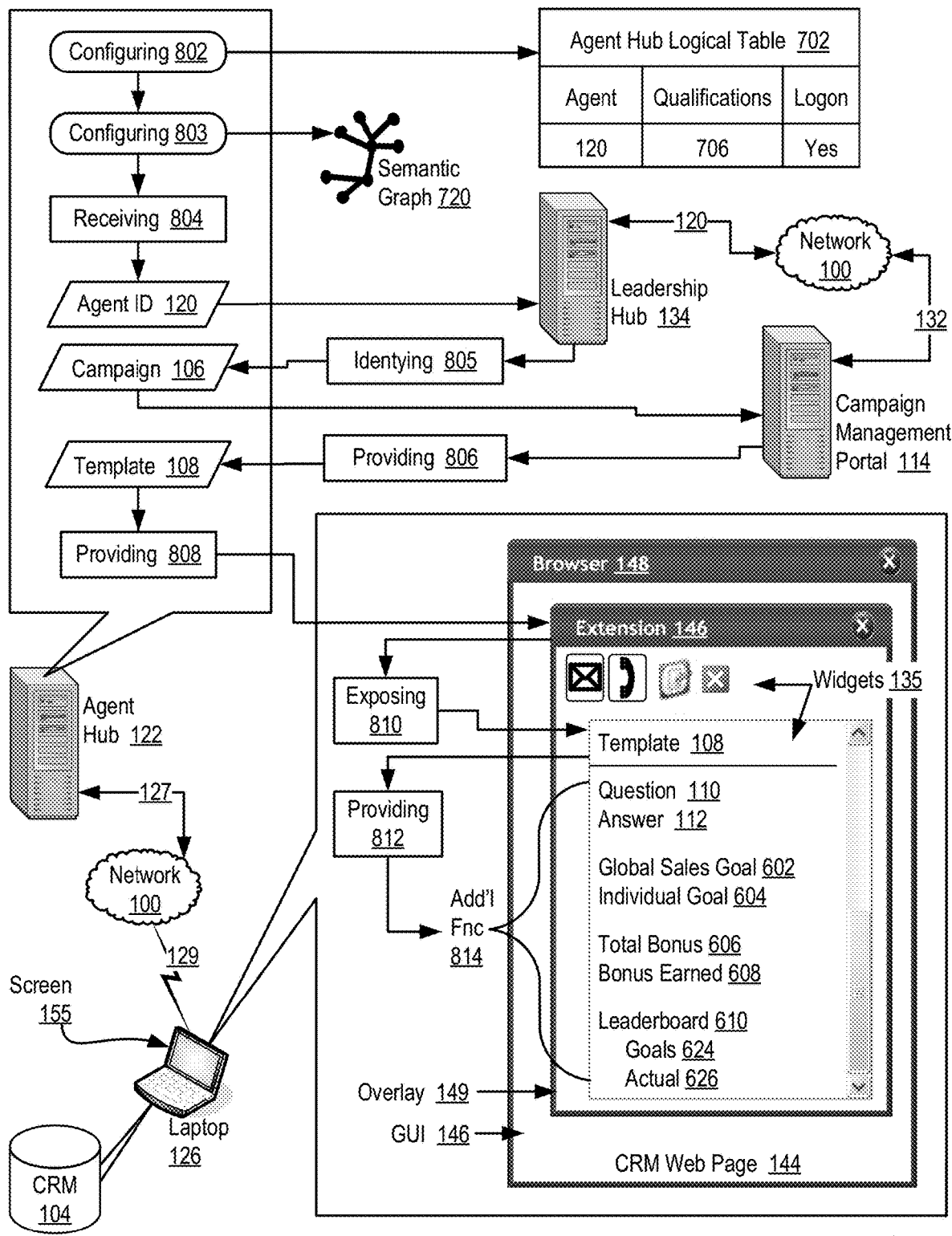
FIGS. 8 and 9 set forth flow charts illustrating additional example methods of agnostically augmenting a CRM application according to embodiments of the present invention.

For further explanation, FIG. 8 sets forth a flow chart illustrating a further example method of agnostically augmenting a CRM application (104) according to embodiments of the present invention. The method of FIG. 8 is implemented in automated computing machinery that includes a display screen (155). The automated computing machinery includes the computer, laptop (126), of which the display screen is a component. The automated computing machinery also includes an agent hub (122), a leadership hub (134), a campaign management portal (114), and a network (100) that couples the automated computing machinery for data communications. The laptop (126) bearing the display screen (126) is coupled for data communication to the agent hub (122) through wireless connection (129) and network (100).

The method of FIG. 8 includes two example methods of configuring computer memory that associates an identity of a tele-agent (120), the tele-agent's qualifications (706), and an indication whether the tele-agent is logged on (Yes/No) to the agent hub (122). The method of FIG. 8 includes the example of configuring (802) by the agent hub computer memory according to a logical table (702), the table including logical columns identifying the tele-agent (120) assigned to the sales campaign, the tele-agent qualifications (706), and the indication (Yes) whether the tele-agent is logged on to the agent hub. The method of FIG. 8 also includes the further example of configuring (803) by the agent hub computer memory as a semantic graph (720), the graph including the identity of a tele-agent assigned to the sales campaign, the tele-agent's qualifications, and an indication whether the tele-agent is logged on to the agent hub. The logical table (702) associating agent, qualifications, and logon as well as the semantic graph (720) are explained in more detail above with reference to FIG. 7.

The method of FIG. 8 also includes receiving (804) by an agent hub of the machinery, from data input through the browser, an identification of a tele-agent (120) assigned to the sales campaign. That is, an agent logs on through the browser, including the extension and the template, to the agent hub, providing logon credentials, including the agent's identification. The agent hub (122) hands off the agent's ID to the leadership hub (134), querying for sales campaigns to which the agent is assigned for work. The method of FIG. 8 then includes identifying (805) by the leadership hub to the agent hub the sales campaign (106) from association with the tele-agent assigned to the sales campaign. The agent could be assigned part time each to more than one campaign. The leadership hub would then identify to the agent hub all campaigns to which the agent is assigned.

The agent hub then queries the campaign management portal with an identification of a sales campaign to which the agent is assigned, and the campaign management portal provides (806) to the agent hub the template (108) from association with the sales campaign. Now in possession of the pertinent template, the agent hub provides (808) the template to the browser extension (146).

The browser extension exposes (810) the sales template of the sales campaign (106) on the display screen (155) as an overlay (149) upon a web page (144) of the CRM application (144). The overlay (149) is implemented upon a graphical user interface ("GUI") (146) of the display screen so that the template lies above and at least part of the time, or at least partly, or at least in this example, obscures the underlying CRM web page (144) on the same GUI.

The template includes functionality beyond that provided by the CRM application, including at least a question (110) and an answer form (112) for the question, with the question and the answer form pertinent to the sales campaign. The method of FIG. 8 also includes providing (812), by the template, functions additional (814) to functionality of the CRM application, the additional functionality including data processing for the question (100) and the answer form (112). Providing (812) such additional functionality (814) also includes in this example providing through the template additional data processing in support of a global sales goal (602) for a campaign and an individual goal (604) for a tele-agent assigned to work on the campaign, a total performance bonus (606) for the agent for a campaign and the portion (608) of the total earned by the agent, and a leaderboard (610) comprising performance goals (624) for each agent assigned to the campaign and actual performance (626) by each agent. The template exposes such additional functionality through GUI widgets (135) of the template as displayed on the display screen. As explained in more detail below regarding the example of FIG. 9, in embodiments the additional functionality (814) includes storing actual answers to the template questions (110) in memory of the agent hub, in association with a campaign, and, for convenient reference in some embodiments at least, also in association with a pertinent question from the template.

The additional functionality (814) is provided by the template identically for disparate CRM applications. The template knows nothing about the client's CRM (104) or the web pages (144) implementing the client CRM, so it works the same across different CRMs. The data displayed by the template will vary across client CRMs because the content of sales campaigns will so vary, so the template will display and process data differently across CRMs, but the template will never have any information whatsoever regarding the client CRMs as such. The screen (155) displaying the template (108) will display through the template no data regarding the structure or function of any client CRM application. The screen (155) displaying the template (108) implements no interface between the CRM application (104, 144) and the template. Thus the screen (155) displaying the template (108) is characterized as agnostically augmenting the CRM application (104).

Viewed as a use case, the overall operation of the method of FIG. 8 is that an agent logs on to the system composed of the agent hub (122), the leadership hub (134), and the campaign management portal (114). The hub and the portal form an overall system coupled for data communications by, for example, a network (100). An agent, by providing (804) security credentials including the agent's identification (120), logs on to the overall system through the agent hub by use of a computer, a desktop computer, a tablet computer, a smartphone, or, as in this example, a laptop (126). The agent operates a browser (148) on the agent's computer. The agent navigates the browser to a web page (144) of a web application exposed by a CRM application (104). The browser has installed upon it a browser extension (146) programmed to operatively expose a sales template of the system. "Operatively expose" means that the template so exposed is functional for data processing, displaying data of the template, accepting data input from the agent.

The agent hub queries the leadership hub (134) with the agent's identification (120) to retrieve (805) one or more sales campaigns (106) to which the agent is assigned to work. The agent can be assigned part time to more than one campaign, and if the agent is assigned to more than one, then the agent hub asks the agent, by, for example, a pull-down menu, which campaign the agent presently will work on. The agent selects. The agent hub queries the campaign management hub for the template corresponding to the selected campaign, or, if the agent is assigned only to one, queries for the template of that only campaign. The agent hub provides (808) the template (108) through the extension (146) of the browser (148), displaying questions (110) and answer forms (112), and accepting input of actual answers to the questions.

Figure 9:
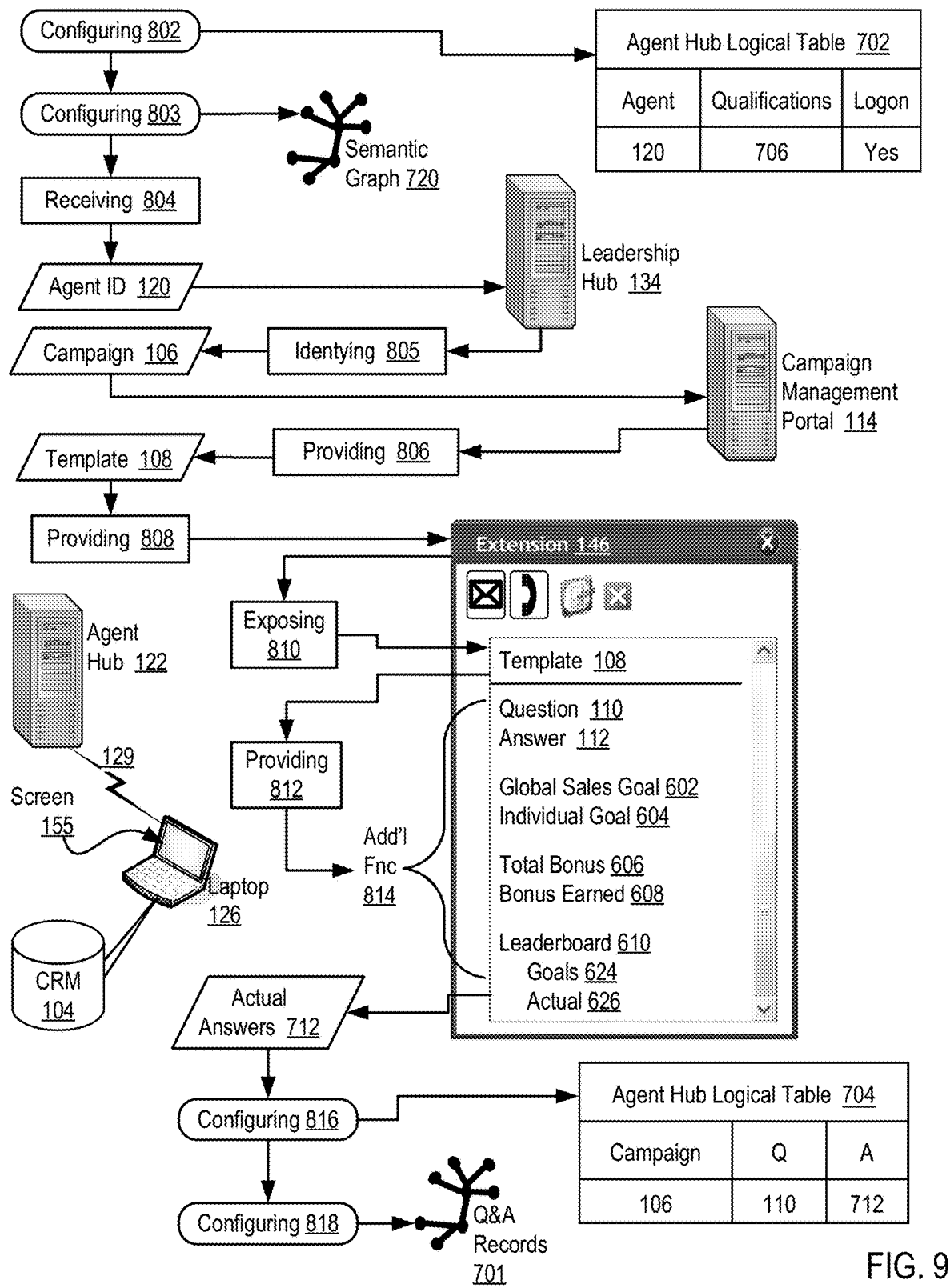

For further explanation, FIG. 9 sets forth a flow chart illustrating a further example method of agnostically augmenting a CRM application (104) according to embodiments of the present invention. The method of FIG. 9, like the method of FIG. 8, is implemented in automated computing machinery that includes a display screen (155), a computer bearing the display screen (126), an agent hub (122), a leadership hub (134), and a campaign management portal (114), all coupled for data communications through a network (100 on FIG. 8). The method of FIG. 9 is similar to the method of FIG. 8, including as it does configuring (802)

memory according to a logical table (702) and configuring (803) a semantic graph (720) in physical memory of an agent hub, such memory configures so as to associate an identity of a tele-agent, the tele-agent's qualifications, and an indication whether the tele-agent is logged on to the agent hub.

The method of FIG. 8 also includes receiving (804) by an agent hub of the machinery, from data input through the browser, an identification of a tele-agent (120) assigned to the sales campaign. The method of FIG. 8 includes identifying (805) by the leadership hub to the agent hub the sales campaign (106) from association with the tele-agent assigned to the sales campaign. The method then includes the campaign management portal's providing (806) to the agent hub the template (108) from association with the sales campaign. Now in possession of the pertinent template, the agent hub provides (808) the template (108) to the browser extension (146).

The browser extension exposes (810) the sales template of the sales campaign (106) on the display screen (155) as an overlay (149) upon a web page (144) of the CRM application (144). The method of FIG. 8 also includes providing (812), by the template, functions additional (814) to functionality of the CRM application (104).

The method of FIG. 9 also includes two example methods of configuring (816) by an agent hub (122) computer memory (704, 701) that associates the campaign (106) with actual answers responsive to questions from a sales template. The method of FIG. 9 includes configuring (816) by the agent hub computer memory according to a logical table (704), with the table including logical columns associating the campaign (106) with actual answers (712) responsive to questions (110) from a sales template (108). The method of FIG. 9 also includes configuring (818) by the agent hub, as a semantic graph (701) in physical memory of the agent hub, associations among the campaign (106) and actual answers (712, 714, 716 on FIG. 7) responsive to questions (110, 308, 312 on FIG. 7) from a sales template (108). The logical table (704) associating campaign, questions, and actual answers as well as the semantic graph (701) are explained in more detail above with reference to FIG. 7.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

The invention claimed is:

1. Automated computing machinery that agnostically augments a customer relationship management ("CRM") application, the machinery comprising:
an agent hub comprising a module of the automated computing machinery configured with computer memory that associates an identity of a tele-agent and an indication whether the tele-agent is logged on to the agent hub;
the agent hub operatively coupled for data communications to a browser, the browser bearing a browser extension through which a sales template for a sales campaign to which the tele-agent is assigned to work is operatively exposed as an overlay upon a graphical user interface ("GUI") of the browser, the overlay overlaid upon a web page of the CRM application;
a leadership hub, the leadership hub comprising a module of the machinery configured with computer memory that associates the tele-agent and the sales campaign to which the tele-agent is assigned, the leadership hub operatively coupled for data communications to the agent hub; and
a campaign management portal, the campaign management portal comprising a module of the machinery configured with computer memory that associates the sales campaign and a display template, the display template associating a question and an answer form, the campaign management portal operatively coupled for data communications to the agent hub,
wherein each of the agent hub, the leadership hub, and the campaign management portal is external to the CRM application, and the automated computing machinery augments the CRM application independent of a structure or function of the CRM application.

2. The machinery of claim 1 further comprising the CRM application at least partly exposed operationally upon the GUI as a web application.

3. The machinery of claim 1 with the browser extension comprising a source code program installed as a component of the browser.

4. The machinery of claim 1 with the browser extension comprising browser functionality that is additional to functionality of the CRM application, the browser extension providing such additional functionality identically for disparate CRM applications.

5. The machinery of claim 1 further comprising the agent hub configured with computer memory arranged according to a logical table, the table comprising logical columns identifying the tele-agent and the indication whether the tele-agent is logged on to the agent hub.

6. The machinery of claim 1 further comprising the identity of the tele-agent and the indication whether the tele-agent is logged on to the agent hub configured as a semantic graph in the computer memory of the agent hub.

7. The machinery of claim 1 further comprising the agent hub configured with computer memory associating the campaign with actual answers responsive to questions from the sales template.

8. The machinery of claim 1 with computer memory that associates the tele-agent and the sales campaign to which the tele-agent is assigned configured according to a logical table, the table comprising a plurality of logical columns including a column identifying sales campaigns and a column identifying corresponding tele-agents, the table further comprising a plurality of logical rows, each row representing an assignment of a corresponding tele-agent to work on a corresponding sales campaign.

9. The machinery of claim 1 with computer memory that associates the sales campaign and the display template configured according to a logical table, the table comprising a plurality of logical columns including a column identifying sales campaigns and a column identifying corresponding display templates, the logical table further comprising a plurality of logical rows, each row associating a corresponding sales campaign and a corresponding display template.

10. The machinery of claim 1 with computer memory that associates the tele-agent and the sales campaign to which the tele-agent is assigned configured as a semantic graph.

11. The machinery of claim 1 with computer memory that associates the sales campaign and the display template configured as a semantic graph.

12. The machinery of claim 1 wherein the machinery does not directly interface with the CRM application.

13. A method of agnostically augmenting a customer relationship management ("CRM") application, the method implemented in automated computing machinery, the method comprising:

receiving, from a browser extension by an agent hub of the machinery, an identification of a tele-agent assigned to a sales campaign, the agent hub comprising a module of the machinery, the agent hub coupled for data communication to a computer running the browser extension;

identifying by a leadership hub to the agent hub the sales campaign from association with the tele-agent, the leadership hub comprising a module of the machinery;

providing by a campaign management portal to the agent hub a sales template from association with the sales campaign, the campaign management portal comprising a module of the machinery;

providing, by the agent hub to the browser extension, the template;

exposing, by the browser extension the sales template as an overlay upon a web page of the CRM application, the template; and providing, by the template, functions additional to functionality of the CRM application, wherein each of the agent hub, the leadership hub, and the campaign management hub is external to the CRM application, and the CRM application is augmented independent of a structure or function of the CRM application.

14. The method of claim 13 with the additional functionality comprising data processing for a question element of the template and an answer form for the question, the template exposing such additional functionality through graphical user interface ("GUI") widgets of the template as displayed on a display screen of the computer running the browser.

15. The method of claim 13 comprising no data regarding the structure or function of the CRM application, no interface between the CRM application and the machinery, the functions of the template agnostically augmenting the CRM application.

16. The method of claim 13 further comprising configuring, by the agent hub, computer memory according to a logical table, the table including logical columns identifying a tele-agent assigned to the sales campaign and an indication whether the tele-agent is logged on to the agent hub.

17. The method of claim 13 further comprising configuring, by the agent hub, computer memory as a semantic graph, the graph including an identity of the tele-agent assigned to the sales campaign and an indication whether the tele-agent is logged on to the agent hub.

18. The method of claim 13 further comprising configuring, by the agent hub, computer memory according to a logical table, the table including logical columns associating the campaign with actual answers responsive to questions from the sales template.

19. The method of claim 13 further comprising configuring, by the agent hub, computer memory as a semantic graph, the graph including associations among the campaign and actual answers responsive to questions from the sales template.

20. The method of claim 13 further comprising the template implementing the functions additional to functionality of the CRM application identically for disparate CRM applications.

* * * * *